United States Patent
Gabryjelski

(10) Patent No.: US 7,475,189 B2
(45) Date of Patent: Jan. 6, 2009

(54) ADVANCED HARDWARE AND SOFTWARE ENCAPSULATION OF RAID SOLUTIONS TO FACILITATE DATA PROTECTION

(75) Inventor: Henry P Gabryjelski, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 447 days.

(21) Appl. No.: 11/072,586

(22) Filed: Mar. 4, 2005

(65) Prior Publication Data

US 2006/0200626 A1     Sep. 7, 2006

(51) Int. Cl.
*G06F 12/00*    (2006.01)

(52) U.S. Cl. .................. 711/114; 711/111; 711/156; 711/162; 707/204; 714/2; 714/6

(58) Field of Classification Search ................ 711/114, 711/111, 156, 162; 707/204; 714/2, 6
See application file for complete search history.

(56) References Cited

U.S. PATENT DOCUMENTS

| 6,862,661 B2* | 3/2005 | Riedle et al. ............. 711/114 |
| 7,225,317 B1* | 5/2007 | Glade et al. ............. 711/206 |
| 7,328,364 B1* | 2/2008 | Leong et al. ............. 714/6 |
| 2002/0199059 A1* | 12/2002 | Riedle et al. ............. 711/114 |

OTHER PUBLICATIONS

White et al., "LegionFS: a secure and scalable file system supporting cross-domain high-performance applications," ACM, pp. 1-10, Nov. 2001.*
Alvarez et al., "Tolerating Multiple Failures in RAID Architectures with Optimal Storage and Uniform Declustering," ACM, pp. 62-72, Dec. 1997.*
"Easier RAID Upgrades in View", Storage Magazine, Dec. 2003, web page, http://searchStorage.techtarget.com/magazineFeature/0,296894,sid5_gci1258581,00.html.*
"Common RAID Disk Data Format Specification", Revision 00.45.00, SNIA: Storage Networking Industry Association, Mar. 5, 2004, 82 pages.
INTEL, "Extensible Firmware Interface Specification" Version 1.10, Chapter 11, Protocols—Bootable Image Support, Dec. 1, 2002, pp. 11-1 thru 11-58.

* cited by examiner

*Primary Examiner*—Stephen C Elmore
(74) *Attorney, Agent, or Firm*—Amin, Turocy & Calvin, LLP

(57) ABSTRACT

Systems and methodologies that enable restoration of data by software solutions and in the absence of a hardware RAID adapter, via encapsulation of a RAID (Redundant Array of Independent/or Inexpensive Disks) format, by employing a Globally Unique Identifier (GUID) Partition Table (GPT). Third party vendors can employ proprietary data recovery software to access the raw data in case of malfunction of an associated RAID adapter. Moreover, the subject invention can facilitate inter-operability among a plurality of RAID adapters, to move array sets from one controller type to another.

20 Claims, 7 Drawing Sheets

PRIOR ART

ADVANCED HARDWARE AND SOFTWARE ENCAPSULATION OF RAID SOLUTIONS TO FACILITATE DATA PROTECTION

TECHNICAL FIELD

The subject invention relates generally to Redundant Array of Inexpensive/Independent Drives (RAIDS), and in particular to encapsulation of a RAID format using a Globally Unique Identifier (GUID) Partition Table (GPT), in a RAID configuration.

BACKGROUND OF THE INVENTION

Increasing advances in computer technology (e.g., microprocessor speed, memory capacity, data transfer bandwidth, software functionality, and the like) have generally contributed to enhanced computer application in various industries. Accordingly, requirements to store vast amounts of data in many computer systems, as well as the ever-growing demand to access the data, has pushed system developers to seek ways of providing fast, multiple-user access to the data.

Array of disks are commonly employed for computer-based data storage. One category of disk arrays is referred to as Redundant Array of Inexpensive/Independent Drives (RAID). Within a RAID system, varying levels of data storage redundancy are utilized to enable reconstruction of stored data in the event of data corruption or disk failure. These various types of redundant storage strategies are referred to as RAID levels.

In general, hardware RAID solutions use on-disk RAID formats (e.g., data structures configured to any one of a plurality of RAID specifications) for data access (e.g., read, write, . . . ) on disks used in RAID configurations. If a disk used in RAID configuration is removed from the RAID array, and placed into another machine without employing an adapter, then such disk is typically not recognized because of the custom formats in use. As such, the Operating System (OS) can typically write new data to such disks, and accidentally destroy vital data. Alternatively, even though data may be "recognized" due to the correct partition table and boot sector, nonetheless the remainder of the disk may not be correctly identified due to the data being spread across multiple disks, such as the use of Striping, (e.g., RAID 0.)

Typically, RAID 0 ("striping") places data across multiple disks without redundancy. A common implementation is to simply alternate 64k sections between two disks. For example, disk "0" can have the boot sector and signature for the volume (e.g., stripe logical sectors 0-127 exist at sectors 0-127 on the disk, and stripe logical sectors 256-383 exist at sectors 128-255, and the like), while disk "1" would contain stripe logical sectors 128-255 on its sectors 0-127, and stripe logical sectors 383-511 on its sectors 128-255, and the like. When Disk 0 of such stripe is inserted into a machine without using the hardware RAID adapter, since the first 64k of data is correct, the machine can identify the boot sector (sector 0) and the associated information. The machine can then attempt to boot and fail. On the other hand, if installed as the non-boot partition, the OS can identify a partition table and employ it to describe the disk. Yet, such process can corrupt the file system data, as some file systems are not designated as read-only during the mounting phase. In addition, user confusion can result from receiving an error message, in a form of the display of a "corrupt" file system, for example.

Likewise, when Disk "1" of such stripe is inserted into a machine without using the hardware RAID adapter, the machine identifies the disk as "un-initialized". Accordingly, Windows can write a "signature" into the boot sector (sector 0) of each disk for a unique identification. Since this sector is actually sector 128 of the stripe set, such signature writing can potentially destroy vital data on the disk. In addition, typically the user may not be aware that the disk in question is part of a stripe set, or that the disk may in fact contain useful information, thus subjecting it to potential loss of data.

Similar problematic scenarios can occur for other RAID types (e.g., RAID 5), wherein non-unique IDs can cause other problems, and when using mirroring (e.g., RAID 1). Moreover, when drives are removed from existing systems due to configuration changes, accidental data destruction can occur if the drives are connected to the wrong type of controller.

Therefore, there is a need to overcome the aforementioned exemplary deficiencies associated with conventional systems and devices.

SUMMARY OF THE INVENTION

The following presents a simplified summary of the invention in order to provide a basic understanding of one or more aspects of the invention. This summary is not an extensive overview of the invention. It is intended to neither identify key or critical elements of the invention, nor to delineate the scope of the subject invention. Rather, the sole purpose of this summary is to present some concepts of the invention in a simplified form as a prelude to the more detailed description that is presented hereinafter.

The subject invention provides for encapsulation of a RAID (Redundant Array of Independent/or Inexpensive Disks) format, by employing a Globally Unique Identifier (GUID) as part of a Globally Unique Identifier Partition Table (GPT), to enable restoration of data, via a data recovery component in form of software solutions, and in the absence of a hardware RAID adapter. As such, software written by third party vendors can supply a proper understanding of the vendor specific format within the encapsulation of the GPT partition, to programmatically access the data in raw format. Put differently, third party vendors can employ proprietary data recovery software, to access the raw data of a RAID configuration, in case of malfunction of an associated RAID adapter. Moreover, a propensity of an Operating System (OS) to over write data, (e.g., in the form of a signature) can be mitigated.

In a related aspect of the subject invention, the GPT partition table can appropriately mark the RAID as an "in-use" area, to prevent OS failures, and to facilitate data recovery techniques. Such GPT partition table permits employing an encapsulation of a RAID format, instead of typically applying a proprietary format to the entirety of a disk drive.

The subject invention also facilitates migration of existing arrays that employ an earlier version of an on-disk format, to a later version of such format. For example, if Adapter A employs GUID A, and the company releases a newer adapter namely; Adapter B, a new GUID can be defined to support new advanced features in Adapter B, while at the same time supporting the earlier format.

In a related aspect of the invention, the GPT partition types can be automatically identified to the OS as an unknown type and/or ignored as unknown legacy partitions, to prevent occurrence of any default write on such partition types. Thus, any unknown partitions can be hidden from typical end-user viewing and manipulating, and an accidental overwrite can be mitigated to preserve data integrity. At the same time, a user can still be able to programmatically access such volumes in a raw sense. Moreover, software supplied by a RAID adapter manufacturer can enable recognition of the internal vendor specific format within the GPT partition for a recovery thereof, or transfer/migration to another location, in case of malfunction of an associated RAID adapter. In addition, proper data recovery operation can be implemented, wherein current OS and future adapters having coded definitions of the partitions can be employed.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention may be employed. Other aspects, advantages and novel features of the invention will become apparent from the following detailed description of the invention when considered in conjunction with the drawings.

DETAILED DESCRIPTION OF THE INVENTION

Figure 1:
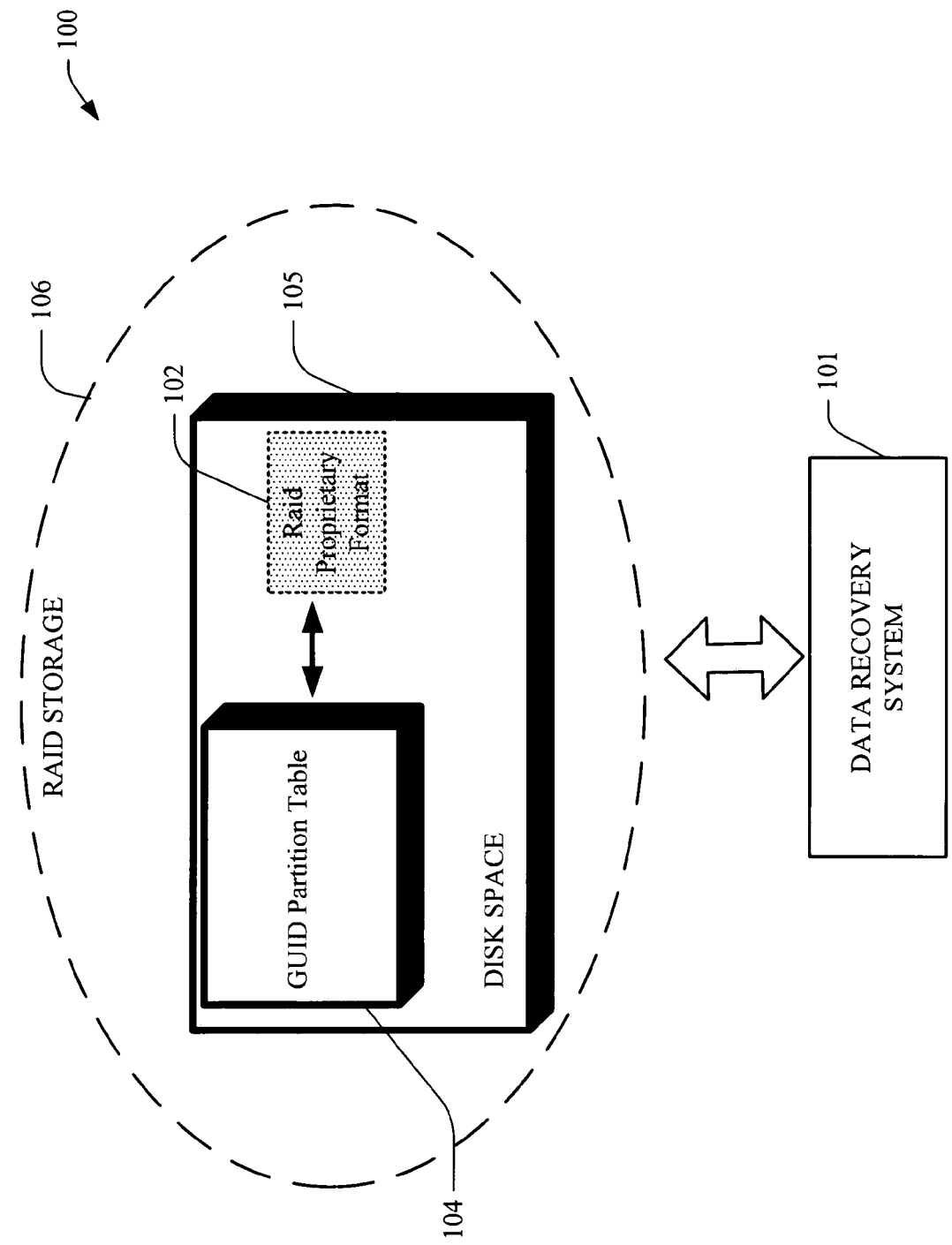
FIG. 1 illustrates a schematic block diagram of a Redundant Array of Inexpensive/Independent Drive (RAID) format encapsulation, by using a Globally Unique Identifier (GUID) Partition Table (GPT) partition, in accordance with an aspect of the subject invention.

The subject invention is now described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention.

As used in this application, the terms "component," "handler," "model," "system," and the like are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal).

Referring initially to FIG. 1, an encapsulation of a RAID format by using a GUID Partition Table is illustrated. Such encapsulation of the RAID format 102, (by using and/or referencing the GUID partition table 104 partition types, can be automatically identified to the Operating System (OS) as an unknown type and/or ignored as unknown legacy partitions, to alleviate occurrence of any default write on such partition types. Thus, any unknown partitions can be hidden from typical end-user viewing and manipulating, and an accidental overwrite can be mitigated to preserve data integrity. At the same time, a user can still be able to programmatically access such volumes in a raw sense. The illustrated arrangement according to an aspect of the subject invention, can enable software data recovery solutions without employing a hardware RAID adapter. For example, software written by third party vendors can supply a proper understanding of the vendor specific format within the encapsulation of the GPT partition 104 to programmatically access the data in raw format. Moreover, a propensity of the OS to over write data, (e.g., in the form of a signature) can be mitigated.

Typically, disk partitioning can be viewed as a precursor of logical volume management. Partitioning can be performed for various reasons, including for example: when two operating systems (OS) cannot co-exist on the same partition and the drive is partitioned into different logical disks for different Operating Systems; when one partition becomes corrupt and one can attempt to salvage data onto another partition; and when some file systems have size limits smaller than a modem disk drive, and the like. As such, for a hard disk, a partition is a contiguous grouping of sectors on the disk where the starting and size are defined by the Master Boot Record (MBR) that can reside on the first sector of the hard disk. For a diskette (Floppy) a partition can be defined to be the entire media. Typically, a system partition can reside on floppy disks, CDROM media, and/or hard disk media (for non-EFI systems), or any media that is supported by Extensible Firmware Interface (EFI).

The EFI is an interface between the firmware, hardware, and operating systems in for example an Itanium 2-based system. The EFI shell is a command-line interface that can provide basic access to the system and to the hard drives for operating system installation, maintenance and for system startup. In addition, the EFI can recognize the MBR storage devices. Typically, the subject invention can mitigate requirement of embedding in the firmware an ability to understand the employed proprietary format, and enabling encapsulation of the GPT partition to programmatically access the data in raw format. As such, third part vendors can employ proprietary data recovery software to access the raw data in case of malfunction of an associated RAID adapter.

Moreover to provide support for MBR, the EFI introduces the disk partitioning structure of the GUID Partition Table, which in accordance with an aspect of the subject invention can store a RAID format 102 as part of such GUID Partition Table 104. Typically, the GPT can support volumes up to 18 exabytes in size, wherein 128 partitions can be created per disk. Such disks partitioned according to the GPT standard can have redundant primary and backup partition tables for improved partition data structure integrity.

The data recovery component 101 can function as restoration application software, which provides a so-called disaster recovery (DR) solution. Such enables a data array system to be restored in an expedited manner to a state which existed before a disaster occurred. Additionally, the data recovery component 101 restores data in the absence of a hardware Redundant Array of Independent (or Inexpensive) Disks (RAID) adapter, by encapsulating a RAID format 102 by using a Globally Unique Identifier (GUID) Partition Table (GPT) 104. Moreover, proper data recovery operation can be implemented, wherein current OS and future adapters having coded definitions of the partitions can be employed.

As illustrated in FIG. 1, when an OS loads on the disk space 105, then a partition that is assigned a GUID 104 (and the respective GPT partition) can be recognized and not be exposed to a user by default. Each partition record can contain a Unique Partition GUID variable that can uniquely identify a partition to be created. Any time a new partition record is created a new GUID can be generated for that partition, and every partition can typically be guaranteed to have a unique GUID. The partition record can contain a partition type GUID that identifies the contents of the partition. A different GUID can be defined for each of the various RAID types.

Accordingly, the GPT partition table can appropriately mark the RAID as an "in-use" area, to prevent OS failures and to facilitate data recovery techniques. Such GPT partition table 104 permits referencing an encapsulation of a RAID format 102, instead of typically applying a proprietary format to the entirety of a disk drive.

Enabling a programmatic access to the data in raw format via the encapsulation of the subject invention, mitigates a requirement of embedding in the firmware an ability to understand the employed proprietary format and lowers the associated costs. As such, third party vendors can employ proprietary data recovery software to access the raw data in case of malfunction of an associated RAID adapter.

Typically, the RAID storage system 106 can incorporate both redundancy and a form of data interleaving, which distributes the data over all the data disks in the array. Redundancy can be usually in the form of an error correcting code, with simple parity schemes predominating. As such, data interleaving is usually in the form of data "striping" in which the data to be stored can be broken down into blocks called "stripe units", which are then distributed across the data disks. A typical size of a stripe unit can for example be 8K to 64K Bytes. In general, a "stripe" is a group of corresponding stripe units, one stripe unit from each disk in the array. Thus, the "stripe size" is equal to the size of a stripe unit multiplied by the number of data disks in the array. The various RAID levels that can advantageously implement various aspects of the subject invention are briefly described below:

RAID-0 utilizes data striping, but does not use redundancy. RAID-0 has a lower cost than any other RAID level, and its write performance is very high because there is no writing of redundant information. Nonetheless, any single disk failure in the array can results in lost data.

On the other hand, RAID-1 employs mirroring in which identical data is stored on two disks, and is simple to implement in software. RAID-1 is also error correcting because complete recovery is possible from the failure of any one disk drive by simply switching to the drive that contains the duplicate copy of the data. After replacing the defective drive, the data on the duplicate drive can be recopied to the replacement drive. When servicing two or more requests to read data that is stored on the same disk, RAID-1 has a faster read rate than RAID-0 because one request can be serviced from the first disk, and the second request can be simultaneously serviced by the duplicate disk. Nonetheless RAID-1 can be more expensive because it can require two times the number of drives necessary to store the same data.

RAID-2 employs error correcting codes such as those found in error correcting semiconductor memory systems. Likewise, RAID-3 employs a separate parity disk to store error correcting parity information and a plurality of data disks that contain bit interleaved data information. Consequently, if a single data drive has failed, the contents of the failed drive can be easily reconstructed using the information from the "good" data drives plus the parity drive. Conceptually, the reconstruction of a specific bit of a failed drive could be accomplished by calculating the parity of the corresponding bit of each of the "good" drives, and then comparing it to the corresponding bit of the parity drive. For example, if the parity of the first bit of each of the "good" drives is a logical 0, and the first bit of the parity drive is a logical 1, then the first bit of the failed drive must have been a logical 1 (because the parity of the first bit of all the data drives must equal logical 1, in this example). Mathematically speaking, the data on the failed disk can be calculated by starting with the parity information from the parity drive and subtracting, modulo two, the corresponding information on the "good" data drives. If, on the other hand, the parity drive fails, parity is easily reconstructed from all the data drives.

For such RAID level, data is bit interleaved on the data disks. For example, a basic RAID-3 system in which data is organized in 8 bit bytes and having 8 data disks and one parity disk would store the first bit of every byte on the first disk, the second bit of every byte on the second disk, on so on. Thus, a write request simultaneously accesses all 8 data disks plus the parity disk, while a read request accesses all 8 data disks. Consequently, the data rate, which is the rate at which data can be written to or read from sequential locations on the disk without head repositioning, is typically very high for RAID-3. Nonetheless, this RAID level only permits one request to be serviced at any one time. RAID-3 systems also have relatively low I/O rates, which is the rate at which data can be written to random locations on the disk, thereby requiring frequent head repositioning. RAID-4 also uses a separate parity disk to store error correcting parity information and a plurality of data disks that contain interleaved data information. Unlike RAID-3, in which data is bit interleaved across the data disks, RAID-4 uses block interleaving or data striping, as explained in detail supra.

The performance of RAID-4 is particularly dependent on the type of access requested, read or write, and the size of the requested access relative to the size of the stripe unit and the size of the stripe. A request to read a block of data that is contained entirely within one stripe unit can be quickly serviced as soon as the disk drive containing the requested data becomes available. Consequently, multiple requests to read various blocks of data, each of which is entirely contained within one stripe unit on a different data drive, can be serviced simultaneously. In contrast, a RAID-3 system must in general service multiple requests serially, and if head repositioning is required between the servicing of each request, the performance of a RAID-3 system will be dramatically slower than a RAID-4 system for this type of access. A read operation of stripe size data blocks can also be very fast in RAID-4, particularly if scheduling permits all data disks to be accessed at one time.

A request to write data to a single stripe unit can be a relatively slow process, because it requires four disk accesses. Specifically, a data write to a single stripe unit requires that the old data and corresponding parity information be read from the appropriate data disk and the parity disk. Next, new parity information can be computed using the old data, the new data and the old parity. Finally, the new data and the new parity are written to the data and parity disks, respectively. Requests for multiple writes to various stripe units located on different drives and in different stripes are even more problematic, because each write requires a read and write operation to the parity disk and, since there is only one parity disk, it can become "bottle necked." Typically, no read operations are required and the parity for the new stripe of data is easily computed. Likewise, RAID-5 is similar to RAID-4 in that it interleaves data by stripe units across the various disk drives, and also stores error correcting parity information. In RAID-5, however, there is no dedicated parity disk as there is in RAID-3 and RAID-4. Instead, RAID-5 distributes parity across all the disk drives, thereby typically eliminating the parity disk bottleneck problem described above with regards to certain write operations of RAID-4 systems. Furthermore, because RAID-5 distributes data over all the disks, and RAID-4 only distributes data over the data disks (which is equal to the total number of disks minus the total number of parity disks), RAID-5 has a slight performance advantage over RAID-4. Moreover, RAID-6 is similar to RAID-5 in that it interleaves data in stripe units and distributes parity information across all the disk drives. By defining a GPT partition type based on a respective RAID type, the subject invention can mitigate requirement of embedding in the firmware an ability to understand the employed proprietary format, and supply a programmatic access the data in raw format.

Figure 2:
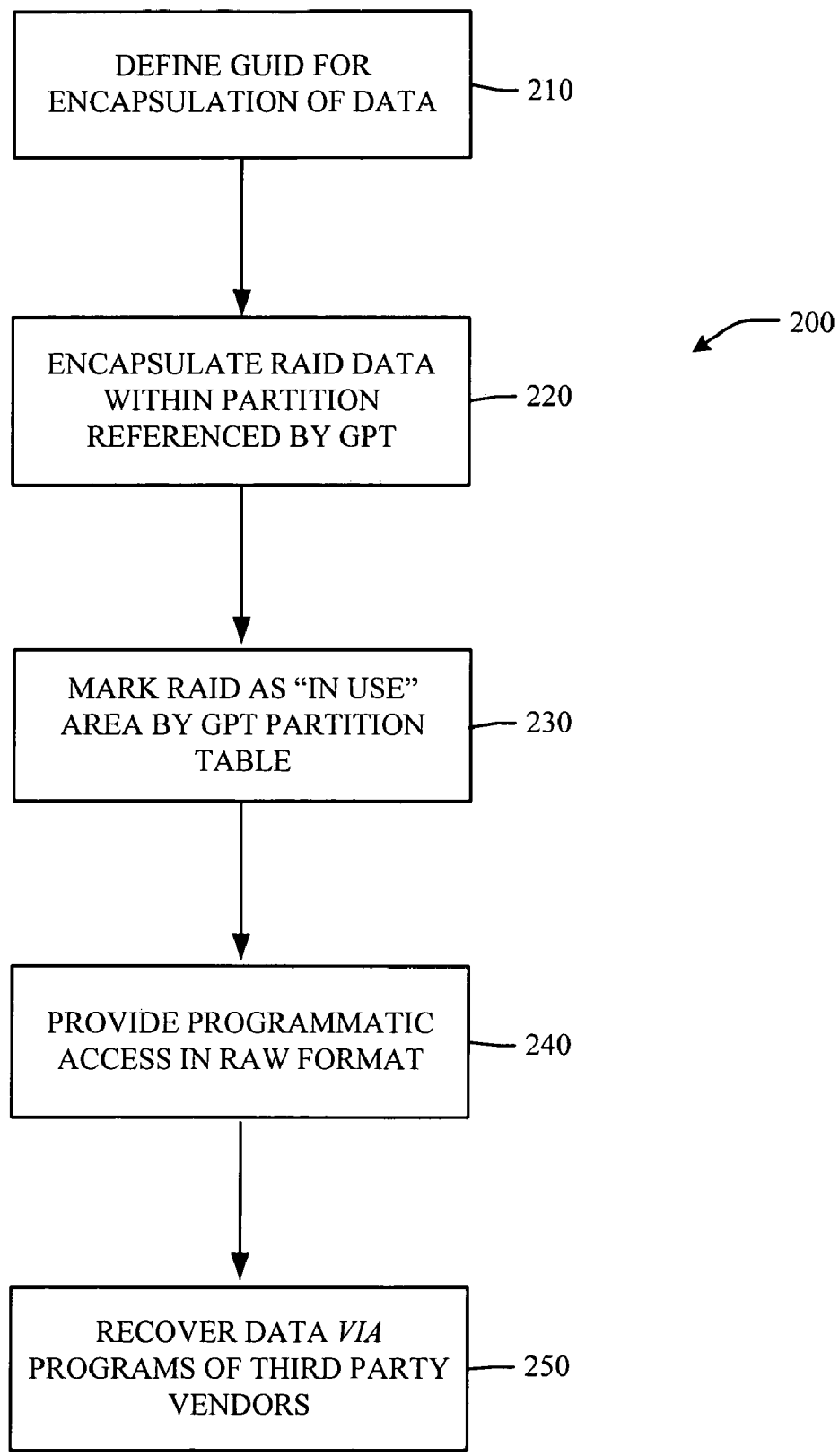
FIG. 2 illustrates an exemplary methodology of data recovery via an encapsulated RAID format according to an exemplary aspect of the subject invention.

FIG. 2 illustrates an exemplary methodology of data recovery in accordance with an aspect of the subject invention. While the exemplary method is illustrated and described herein as a series of blocks representative of various events and/or acts, the present invention is not limited by the illustrated ordering of such blocks. For instance, some acts or events may occur in different orders and/or concurrently with other acts or events, apart from the ordering illustrated herein, in accordance with the invention. In addition, not all illustrated blocks, events or acts, may be required to implement a methodology in accordance with the present invention. Moreover, it will be appreciated that the exemplary method and other methods according to the invention may be implemented in association with the method illustrated and described herein, as well as in association with other systems and apparatus not illustrated or described.

Initially and at 210, a GUID that is a unique number (provided for example by an operating system, an application, or by a user) identifies a particular segment on the RAID configuration area. Subsequently, and at 220 proprietary data can be encapsulated within a partition that can be referenced by a GPT. Such data can subsequently supply a proper understanding of vendor specific format as applied to the RAID array. The subject invention can also mark the associated RAID area as "in use" at 230. As such, a propensity of the OS to over write data, (e.g., in the form of a signature) can be mitigated. Such an arrangement can subsequently provide programmatic access to the data in a raw format at 240, and enable, third party vendors to employ proprietary data recovery software to access the raw data, as in case of malfunction of an associated RAID adapter. Thus, data recovery can be facilitated at 250.

Figure 3:
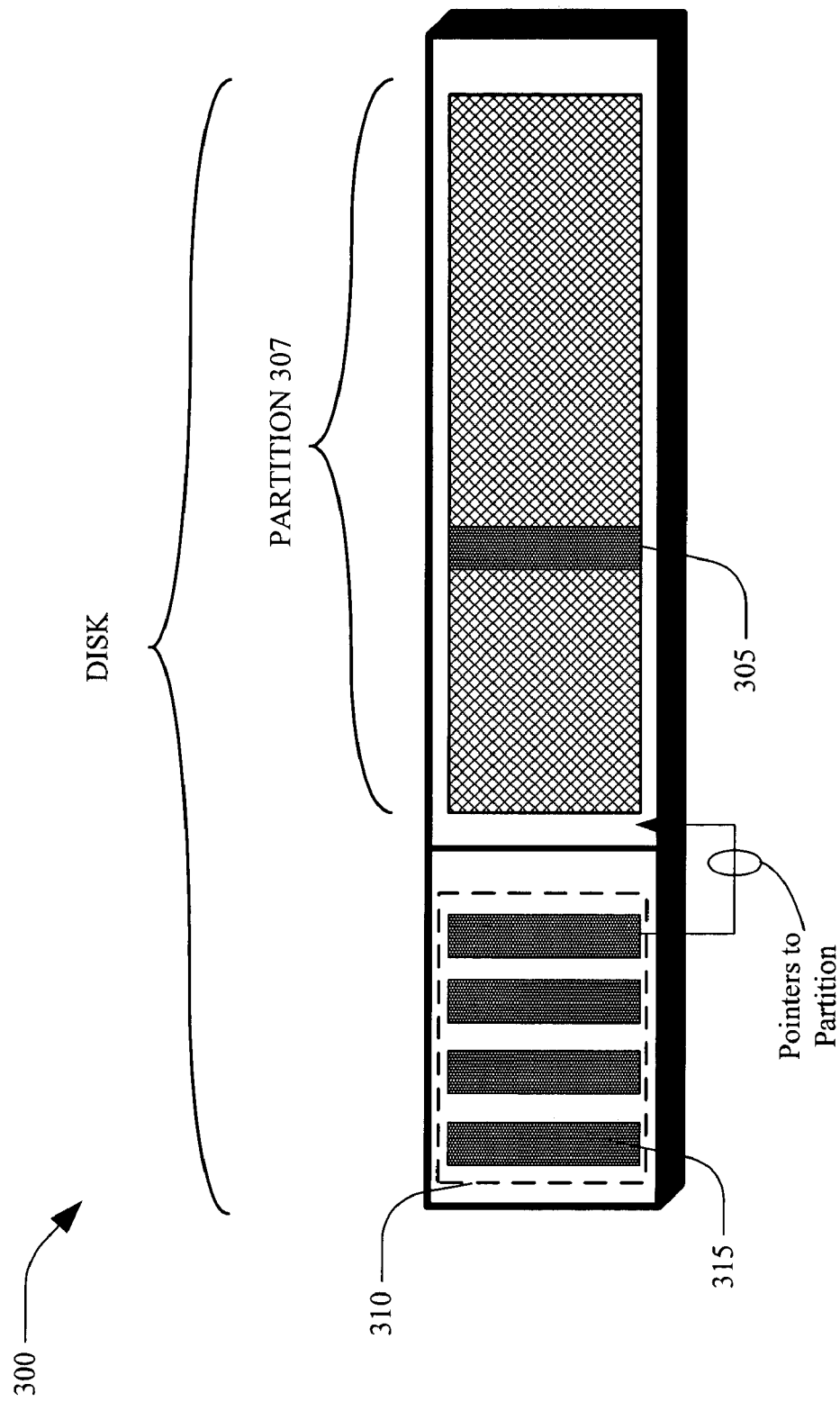
FIG. 3 illustrates a partition arrangement that encapsulates a RAID format in accordance with a further aspect of the subject invention.

Referring now to FIG. 3, there is illustrated a partition arrangement that encapsulates a RAID format in accordance with an aspect of the subject invention. The Globally Unique Identifier Partition Table (GPT) 310 can complement Master Boot Record (MBR) partitioning scheme that has been common to PCs. Such GPT disk partition format 300 can be well defined and fully self-identifying. For example, the encapsulation of the RAID format 305 using the GPT partition entity (ies) 310 can be automatically identified to the OS as an unknown type and/or ignored as unknown legacy partitions, to prevent occurrence of any default write on such partition types. Such an arrangement enables employing a predetermined GUID that can define proprietary and/or standard data, which can supply an understanding of the partition 307, as applied to a RAID array. In addition, such GPT partition table 310 can be backward-compatible with the standard partition table format, in that it can expose itself as single partition for the entire disk.

In addition, a GUID Partition Table Header 315 can define a range of logical block addresses. Such GUID Partition Table Header 315 structure(s) can reside on the first sector, and can further define the range of logical block addresses that are usable by partition entries. In addition, the GUID Partition Table Header can define the size of a GUID Partition Entry element. Moreover, the primary GUID partition table can be located in block "1" of the logical device, and various fields can also be provided that contain the logical block address of the GUID partition header itself. An exemplary GUID Partition Table 310 can include identification of a RAID format, as well as identification as to which version of the EFI specification defines the data. Thus, the RAID format can be encapsulated using the GUID Partition Table 310, and enable restoration of data as described in detail supra, via software solutions and in the absence of a hardware RAID adapter.

Figure 4:
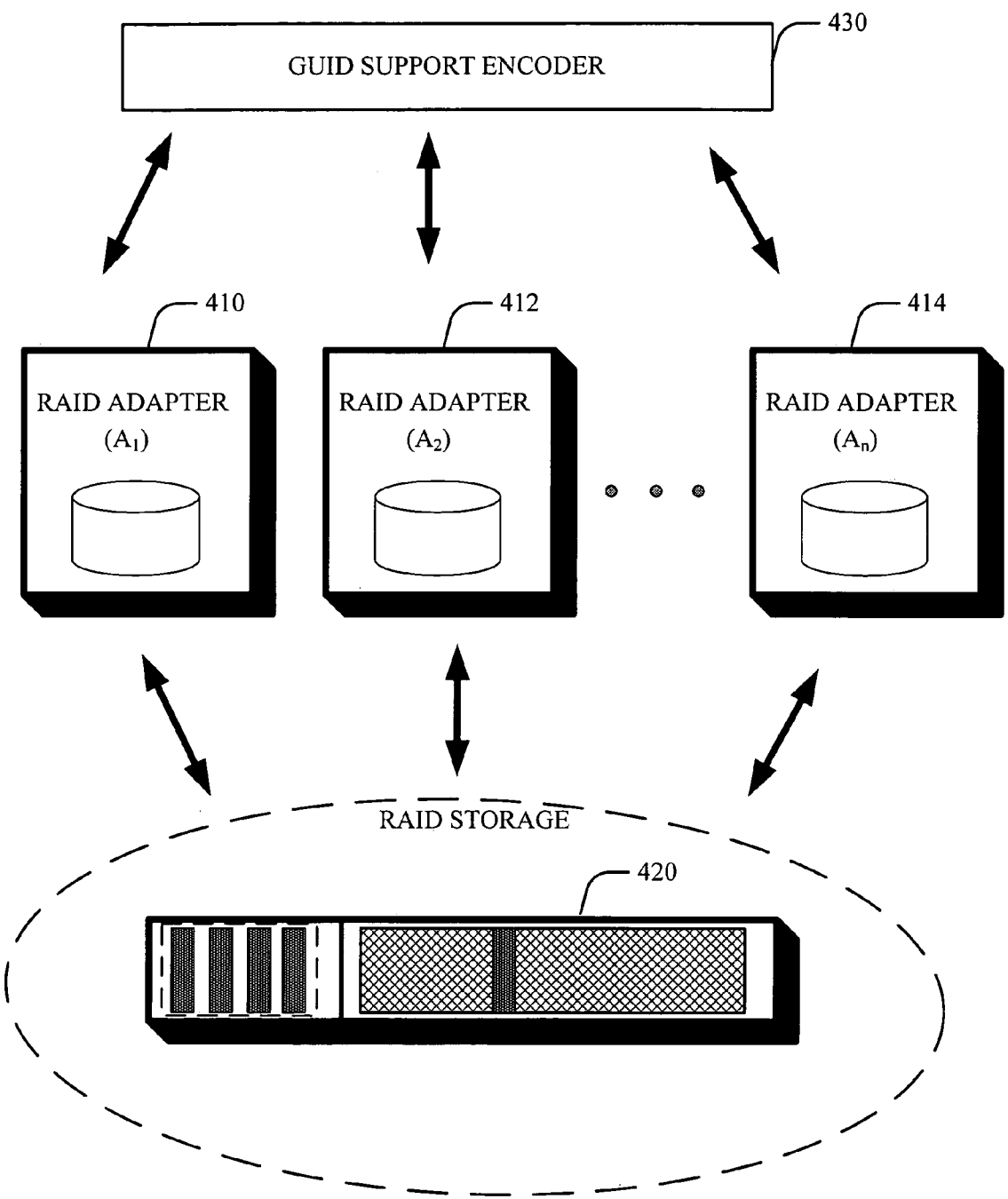
FIG. 4 illustrates a schematic block diagram for migration of an existing data array among a plurality of RAID adapters according to a particular aspect of the subject invention.

In a related aspect, the subject invention can facilitate compatibility among different adapters. FIG. 4 illustrates a schematic block diagram for migration of an existing RAID array among a plurality of RAID adapters 410, 412, 414. Such RAID adapters $A_1$ thru $A_n$ (where n is an integer) 410, 412, 414 can represent a plurality of different RAID adapters, with the data array 420 being migrated therebetween. Such data array 420 can comprise a GUID arrangement that can be initially defined by the manufacturer. To provide inter-operability between the adapters $A_1$ thru $A_n$, 410, 412, 414, a RAID format is encapsulated in the data array 420, as described in detail supra. Accordingly, if adapter $A_1$ malfunctions or ultimately becomes inoperable, data can be unplugged therefrom, and transferred to another adapter that understands the unique proprietary format. Put differently, a GUID that supports a particular RAID type, is understood by the plurality of RAID adapters $A_1$ thru $A_n$. Moreover, support for the GUID is coded within the plurality of RAID adapters $A_1$ thru $A_n$, via the encoder 430 to facilitate migration of existing arrays that employ an earlier version of on-disk format to a later version of such format.

Figure 5:
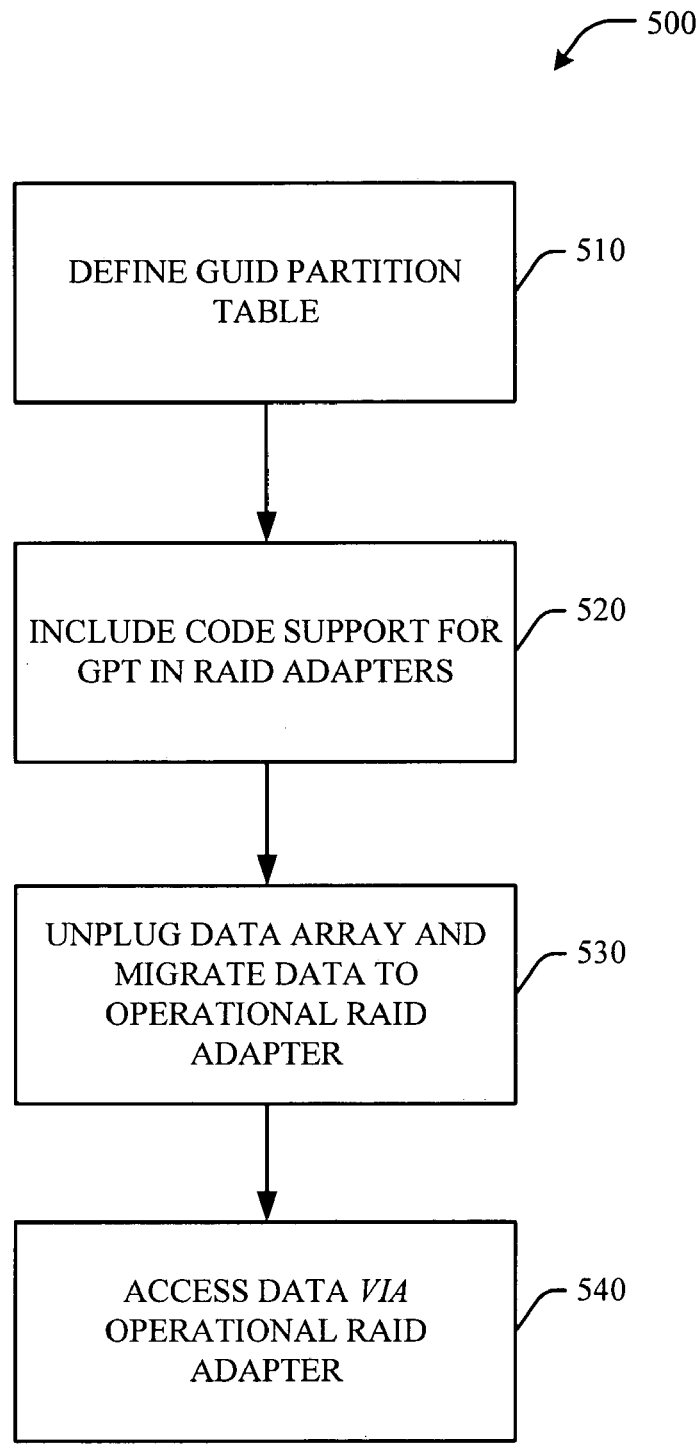
FIG. 5 illustrates an exemplary flow chart for adapter interoperability in accordance with an aspect of the subject invention.

FIG. 5 illustrates an exemplary methodology 500 of adapter inter-operability in accordance with an aspect of the subject invention. Initially and at 510, a GUID Partition Table can be defined for encapsulating data for a particular RAID type, (a different GUID can be defined for each of the various RAID types) in accordance with an aspect of the subject invention. Next, and at 520 a code support for such GUID Partition Table and encapsulation of the proprietary data is included in the manufactured RAID adapters. Upon failure of a RAID adapter, the data array can be unplugged therefrom and transformed to an operational adapter that supports the proprietary format at 530. The data array can then be accessed via the operational adapter at 540. Thus, a GUID that supports a particular RAID type is understood by the plurality of adapters; and the associated data array can be migrated therebetween.

Figure 6:
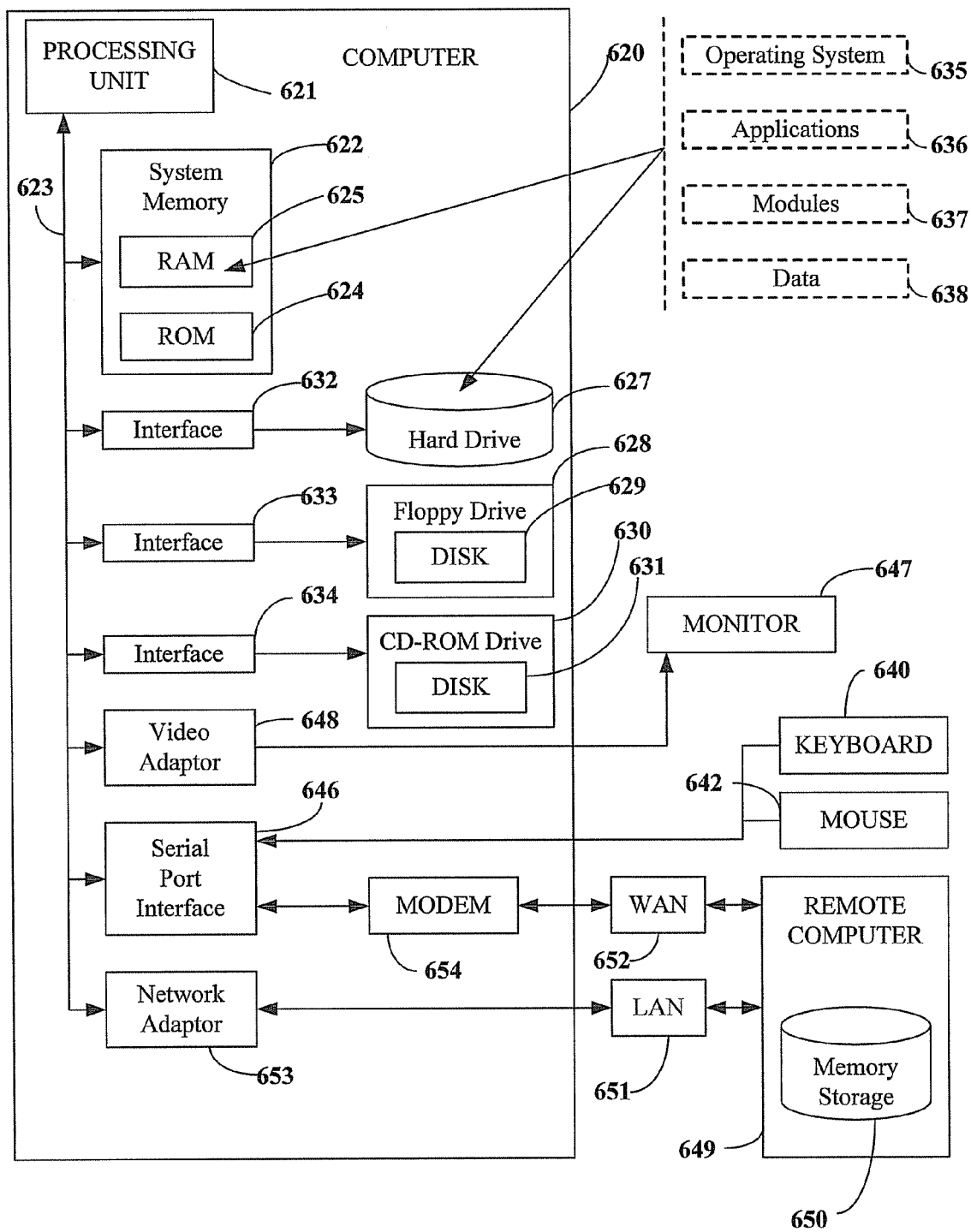
FIG. 6 illustrates a brief, general description of a suitable computing environment wherein the various aspects of the subject invention can be implemented.

Referring now to FIG. 6, a brief, general description of a suitable computing environment is illustrated wherein the various aspects of the subject invention can be implemented.

While the invention has been described above in the general context of computer-executable instructions of a computer program that runs on a computer and/or computers, those skilled in the art will recognize that the invention can also be implemented in combination with other program modules. Generally, program modules include routines, programs, components, data structures, etc. that perform particular tasks and/or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like. As explained earlier, the illustrated aspects of the invention can also be practiced in distributed computing environments where tasks are performed by remote processing devices that are linked through a communications network. However, some, if not all aspects of the invention can be practiced on stand-alone computers. In a distributed computing environment, program modules can be located in both local and remote memory storage devices. The exemplary environment includes a computer 620, including a processing unit 621, a system memory 622, and a system bus 623 that couples various system components including the system memory to the processing unit 621. The processing unit 621 can be any of various commercially available processors. Dual microprocessors and other multi-processor architectures also can be used as the processing unit 621.

The system bus can be any of several types of bus structure including a USB, 1394, a peripheral bus, and a local bus using any of a variety of commercially available bus architectures. The system memory may include read only memory (ROM) 624 and random access memory (RAM) 625. A basic input/output system (BIOS), containing the basic routines that help to transfer information between elements within the computer 620, such as during start-up, is stored in ROM 624.

The computer 620 further includes a hard disk drive 627, a magnetic disk drive 628, e.g., to read from or write to a removable disk 627, and an optical disk drive 630, e.g., for reading from or writing to a CD-ROM disk 631 or to read from or write to other optical media. The hard disk drive 627, magnetic disk drive 628, and optical disk drive 630 are connected to the system bus 623 by a hard disk drive interface 632, a magnetic disk drive interface 633, and an optical drive interface 634, respectively. The drives and their associated computer-readable media provide nonvolatile storage of data, data structures, computer-executable instructions, etc. for the computer 620. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, can also be used in the exemplary operating environment, and further that any such media may contain computer-executable instructions for performing the methods of the subject invention.

A number of program modules can be stored in the drives and RAM 625, including an operating system 635, one or more application programs 636, other program modules 637, and program data 638. The operating system 635 in the illustrated computer can be substantially any commercially available operating system.

A user can enter commands and information into the computer 620 through a keyboard 640 and a pointing device, such as a mouse 642. Other input devices (not shown) can include a microphone, a joystick, a game pad, a satellite dish, a scanner, or the like. These and other input devices are often connected to the processing unit 621 through a serial port interface 646 that is coupled to the system bus, but may be connected by other interfaces, such as a parallel port, a game port or a universal serial bus (USB). A monitor 647 or other type of display device is also connected to the system bus 623 via an interface, such as a video adapter 648. In addition to the monitor, computers typically include other peripheral output devices (not shown), such as speakers and printers.

The computer 620 can operate in a networked environment using logical connections to one or more remote computers, such as a remote computer 647. The remote computer 647 may be a workstation, a server computer, a router, a peer device or other common network node, and typically includes many or all of the elements described relative to the computer 620, although only a memory storage device 650 is illustrated in FIG. 6. The logical connections depicted in FIG. 6 may include a local area network (LAN) 651 and a wide area network (WAN) 652. Such networking environments are commonplace in offices, enterprise-wide computer networks, Intranets and the Internet.

When employed in a LAN networking environment, the computer 620 can be connected to the local network 651 through a network interface or adapter 653. When utilized in a WAN networking environment, the computer 620 generally can include a modem 654, and/or is connected to a communications server on the LAN, and/or has other means for establishing communications over the wide area network 652, such as the Internet. The modem 654, which can be internal or external, can be connected to the system bus 623 via the serial port interface 646. In a networked environment, program modules depicted relative to the computer 620, or portions thereof, can be stored in the remote memory storage device. It will be appreciated that the network connections shown are exemplary and other means of establishing a communications link between the computers can be employed.

In accordance with the practices of persons skilled in the art of computer programming, the subject invention has been described with reference to acts and symbolic representations of operations that are performed by a computer, such as the computer 620, unless otherwise indicated. Such acts and operations are sometimes referred to as being computer-executed. It will be appreciated that the acts and symbolically represented operations include the manipulation by the processing unit 621 of electrical signals representing data bits which causes a resulting transformation or reduction of the electrical signal representation, and the maintenance of data bits at memory locations in the memory system (including the system memory 622, hard drive 627, floppy disks 628, and CD-ROM 631) to thereby reconfigure or otherwise alter the computer system's operation, as well as other processing of signals. The memory locations wherein such data bits are maintained are physical locations that have particular electrical, magnetic, or optical properties corresponding to the data bits.

Figure 7:
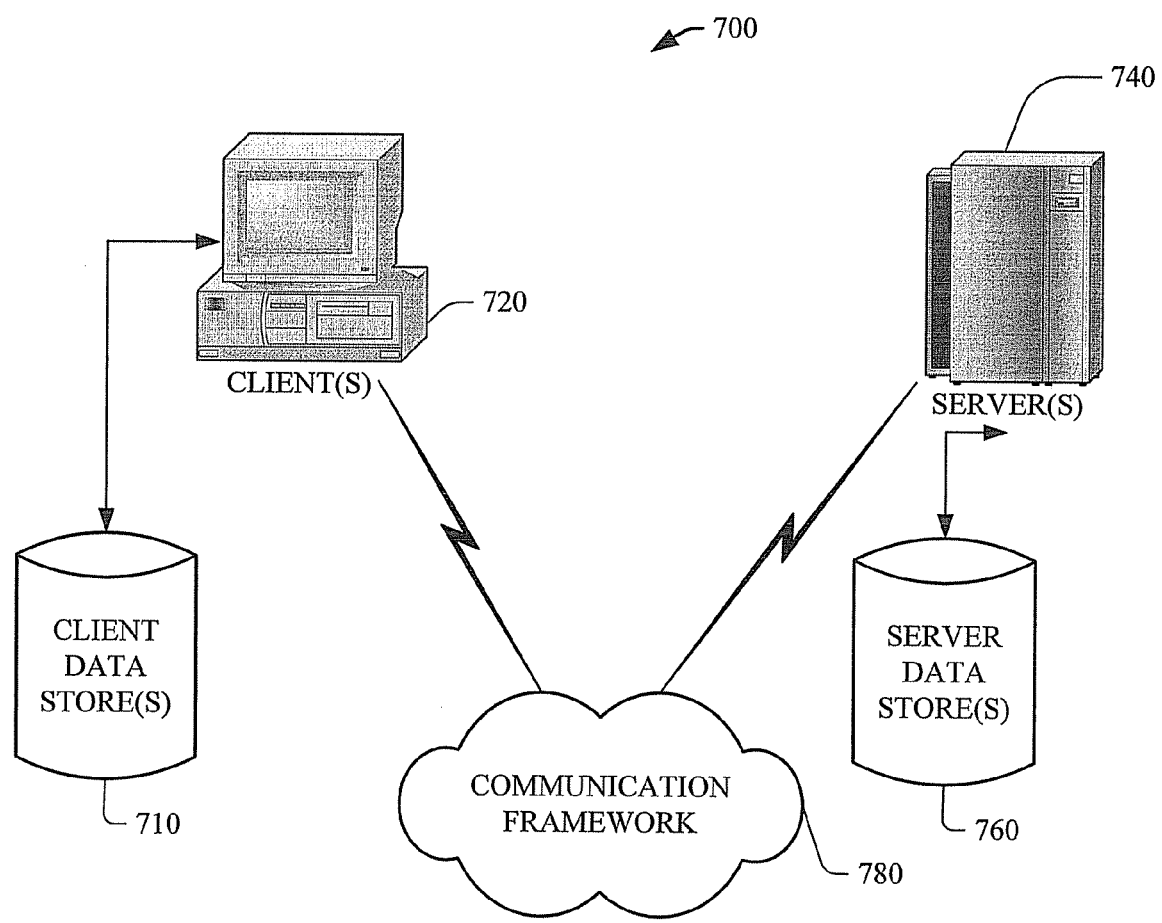
FIG. 7 illustrates a client-server system that can employ a RAID format encapsulation according to one aspect of the subject invention.

Referring now to FIG. 7, a client-server system 700 that can employ an encapsulation of RAID format according to one aspect of the subject invention is illustrated. The client(s) 720 can be hardware and/or software (e.g., threads, processes, computing devices). The system 700 also includes one or more server(s) 740. The server(s) 740 can also be hardware and/or software (e.g., threads, processes, computing devices). For example, such servers 740 can house threads to perform transformations by employing the present invention. The client 720 and the server 740 can communicate, in the form of data packets transmitted according to the present invention, between two or more computer processes. As illustrated, the system 700 includes a communication framework 780 that can facilitate communications between the client(s) 720 and the server(s) 740. The client(s) 720 is operationally connected to one or more client data store(s) 710 that can store information local to the client(s) 720. Moreover, client 720 can access and update databases 760 located on a server computer 740 running a server process. In one aspect of the present invention, the communication frame work 780 can be the internet, with the client process being a Web browser and the server process being a Web server. As such, a typical client 720 can be a general purpose computer, such as a conventional personal computer having a central processing unit (CPU), system memory a modem or network card for connecting the personal computer to the Internet, and a display as well as other components such as a keyboard, mouse, and the like. Likewise a typical server 740 can be university or corporate mainframe computers, or dedicated workstations, and the like.

Although the invention has been shown and described with respect to certain illustrated aspects, it will be appreciated that equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention. Furthermore, to the extent that the terms "includes", "including", "has", "having", and variants thereof are used in either the detailed description or the claims, these terms are intended to be inclusive in a manner similar to the term "comprising."

What is claimed is:

1. A system that facilitates data recovery in Redundant Array of Inexpensive/Independent Drive (RAID) array configurations, comprising:
   a RAID storage medium that includes a Globally Uniquely Identifier Partition Table (GPT) entity, the GPT entity references an encapsulated RAID format; and
   a data recovery component that employs the encapsulated RAID format to programmatically access raw data stored on the RAID storage medium, in absence of hardware RAID adapter(s).

2. The system of claim 1, the RAID storage medium further comprises a predetermined partition that defines a proprietary format.

3. The system of claim 1, the RAID storage medium is at least one of a RAID 0, RAID 1, RAID 2, RAID 3, RAID 4, RAID 5, RAID 6, and RAID 7.

4. The system of claim 1, the RAID storage medium further comprises a Globally Uniquely Identifier (GUID) Partition Table Header that defines logical block addresses for disk(s) associated therewith.

5. The system of claim 4, the GUID Partition Table Header (s) resides on a first sector of the disk(s).

6. A computer implemented method of facilitating data recovery for a Redundant Array of Inexpensive/Independent Drive (RAID) array comprising:
   identifying a segment on a RAID configuration; and
   encapsulating a RAID format within a partition referenced by a Globally Uniquely Identifier Partition Table (GPT) entity associated with the RAID configuration, to facilitate data restoration via software solutions.

7. The method of claim 6 further comprising marking the segment as "in use" for identifying the segment to an Operating System (OS).

8. The method of claim 6 further comprising providing compatibility among a plurality of RAID adapters.

9. The method of claim 8 further comprising employing a predetermined Globally Uniquely Identifier (GUID) to define proprietary data.

10. The method of claim 6 further comprising programmatically accessing data in a raw format.

11. The method of claim 6 further comprising employing the RAID format by third party software vendors.

12. The method of claim 6 further comprising automatically identifying the partition to an Operating System.

13. The method of claim 6 further comprising facilitating a recovery of data via the encapsulation act when an associated RAID adapter fails.

14. The method of claim 13 farther comprising encoding a definition of RAID encapsulation into a farther adapter.

15. The method of claim 14 farther comprising defining the partition based on a respective RAID type.

16. The method of claim 14 farther comprising unplugging a data RAID array from a RAID adapter that has malfunctioned.

17. The method of claim 16 farther comprising migrating or transferring the data RAID array to an operational adapter that supports the RAID format.

18. The method of claim 17 farther comprising accessing the data RAID array via the operational adapter.

19. A system that facilitates data recovery in Redundant Array of Inexpensive/Independent Drive (RAID) array configurations, comprising:
   means for encapsulating a RAID format as part of a RAID array; and
   means for recovering data in a raw format via the means for encapsulating.

20. The system of claim 19 farther comprising means for interoperating the Redundant Array of Inexpensive/Independent Drive (RAID) array among a plurality of RAID adapters.

* * * * *

UNITED STATES PATENT AND TRADEMARK OFFICE
CERTIFICATE OF CORRECTION

| | | |
|---|---|---|
| PATENT NO. | : 7,475,189 B2 | Page 1 of 1 |
| APPLICATION NO. | : 11/072586 | |
| DATED | : January 6, 2009 | |
| INVENTOR(S) | : Henry P. Gabryjelski | |

It is certified that error appears in the above-identified patent and that said Letters Patent is hereby corrected as shown below:

In column 4, line 9, below "via the signal)." insert -- The subject invention provides for systems and methods of enabling an operating system to restore data in the absence of a hardware Redundant Array of Independent (or Inexpensive) Disks (RAID) adapter, by encapsulating a RAID format using a Globally Unique Identifier (GUID) Partition Table (GPT). Encapsulating a RAID format can be defined as encapsulating administrative data structures employed in accessing raw data, such raw data being stored in any of a variety of different RAID formats on a drive or memory, wherein the raw data represents traditional notions of "RAID backup data" (*e.g.*, data that can be of use in reconstructing a failed drive). Thus encapsulating the RAID format provides a level of isolation to the raw data through the encapsulated administrative data structure to protect the raw data against accidental access/corruption and further allows the encapsulation layer to selectively allow access to the raw data to a variety of RAID adapters as is discussed herein in more detail. Further, while the raw data itself is not encapsulated, it can be placed in a partition to protect it as is discussed herein in more detail. --.

In column 4, line 12, delete "types," and insert -- types), --, therefor.

In column 12, line 33, in Claim 14, delete "farther" and insert -- further --, therefor.

In column 12, line 34, in Claim 14, delete "farther" and insert -- further --, therefor.

In column 12, line 35, in Claim 15, delete "farther" and insert -- further --, therefor.

In column 12, line 37, in Claim 16, delete "farther" and insert -- further --, therefor.

In column 12, line 40, in Claim 17, delete "farther" and insert -- further --, therefor.

In column 12, line 43, in Claim 18, delete "farther" and insert -- further --, therefor.

In column 12, line 53, in Claim 20, delete "farther" and insert -- further --, therefor.

Signed and Sealed this
Third Day of May, 2011

David J. Kappos
*Director of the United States Patent and Trademark Office*